Apr. 24, 1923.

D. M. WATTERS 1,452,716

POWER LIFT FOR GROUNDWORKING IMPLEMENTS

Filed Nov. 15, 1920   3 Sheets-Sheet 1

INVENTOR.
Daniel M. Watters.
BY
ATTORNEY

Apr. 24, 1923.
D. M. WATTERS
1,452,716
POWER LIFT FOR GROUNDWORKING IMPLEMENTS
Filed Nov. 15, 1920    3 Sheets-Sheet 2
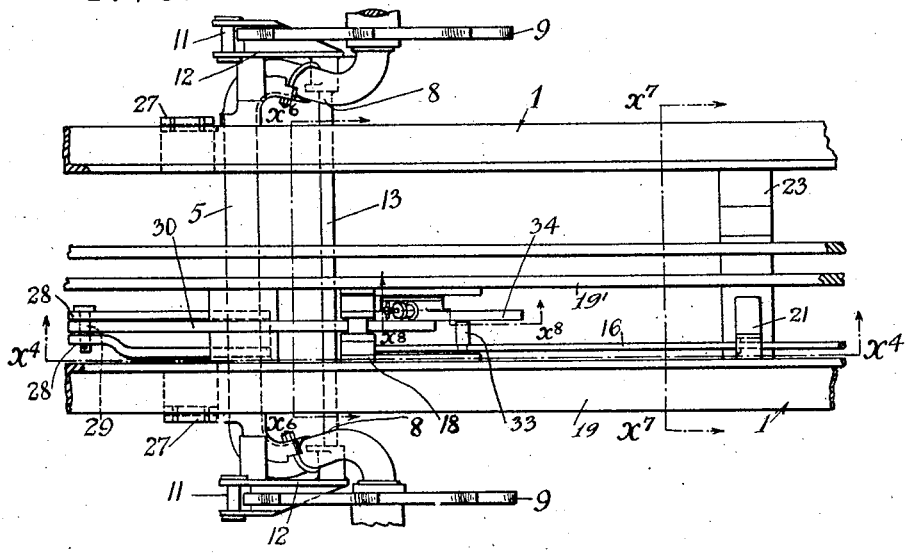
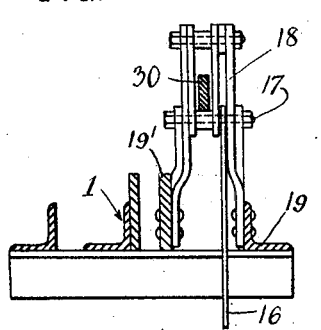
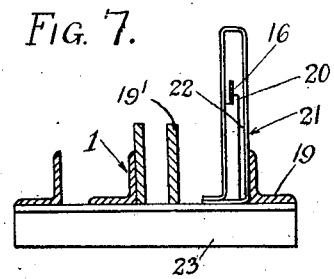
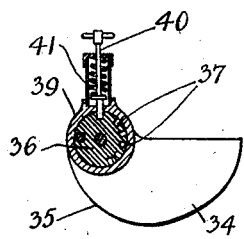
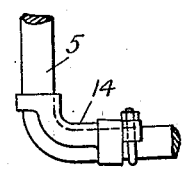
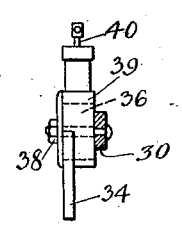
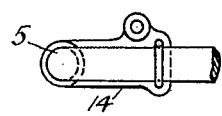
Daniel M. Watters, INVENTOR.
BY
Frederick Bryan ATTORNEY.

Apr. 24, 1923.
D. M. WATTERS
1,452,716
POWER LIFT FOR GROUNDWORKING IMPLEMENTS
Filed Nov. 15, 1920
3 Sheets-Sheet 3

INVENTOR.
Daniel M. Watters
BY
Frederick Whyer
ATTORNEY

Patented Apr. 24, 1923.

1,452,716

UNITED STATES PATENT OFFICE.

DANIEL M. WATTERS, OF LOS ANGELES, CALIFORNIA, ASSIGNOR TO KILLEFER MANUFACTURING COMPANY, OF LOS ANGELES, CALIFORNIA, A CORPORATION OF CALIFORNIA.

POWER LIFT FOR GROUNDWORKING IMPLEMENTS.

Application filed November 15, 1920. Serial No. 424,083.

*To all whom it may concern:*

Be it known that I, DANIEL M. WATTERS, a citizen of the United States, and a resident of Los Angeles, in the county of Los Angeles and State of California, have invented a new and useful Power Lift for Groundworking Implements, of which the following is a specification.

This invention relates to mechanism for raising and lowering ground-working tools such as plows, chisels and the like, the turning of the ground wheels generating the power utilized to lift the plows out of the ground when it is desired to discontinue the plowing operation.

An object of this invention is to effect raising of the implement frame by a comparatively simple mechanism.

Another object is to so construct the lifting mechanism that it can be readily started into operation by the operator of the tractor employed in pulling the implement over the ground.

Another object is to make it possible to readily regulate the depth of penetration of the tools into the ground.

Other objects and advantages will appear hereinafter.

The accompanying drawings illustrate the invention:

Fig. 3 is an enlarged fragmental plan view of some of the parts shown in Fig. 2, the ground wheels and portions of the axle being broken away as well as the front and rear portions of the frame.

Fig. 6 is a fragmental elevation, partly in section, from line indicated by X⁶—X⁶ Fig. 3.

Fig. 7 is a fragmental elevation, partly in section, from line indicated by X⁷—X⁷ Fig. 3.

Fig. 8 is a sectional detail on line indicated by X⁸—X⁸ Fig. 3.

Fig. 9 is an elevation from the left of Fig. 8, the link being shown in section.

Fig. 10 is a plan view of the crank portion of the axle together with one of the clamps that connects said axle with the detent lever.

Fig. 11 is an inverted plan view of Fig. 10.

Figure 1:
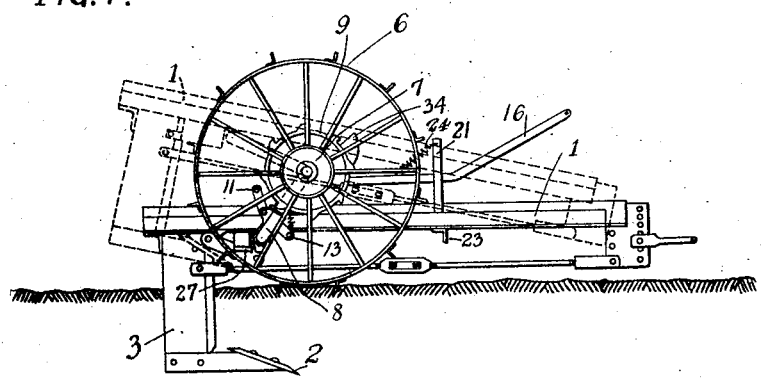
Figure 1 is a side elevation of an implement constructed in accordance with the provisions of this invention, the frame and the parts carried thereby being shown in solid lines in position for plowing, and being shown in broken lines in elevated position.
Figure 2:
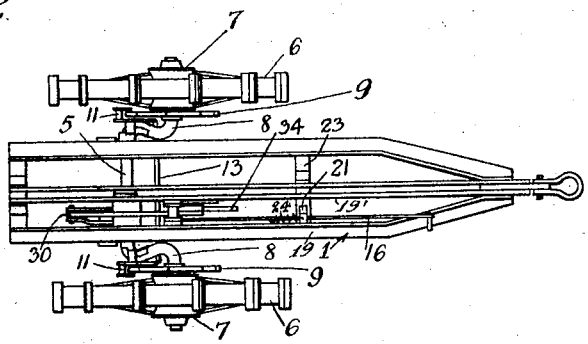
Fig. 2 is a plan view of Fig. 1.

A frame of any suitable construction is indicated at 1 and the ground working tools are supported on the frame. The tools shown in this instance are sub-soil points indicated at 2 and fastened to the frame by standards 3. The frame is provided with bearings 4 in which is journaled a crank axle 5. The opposite ends of the axle 5 are supported on ground wheels 6 and the hubs 7 of the ground wheels constitute fulcrums upon which the axle 5 turns, the crank arms of the axle being indicated at 8.

Mounted on the axle portions that are concentric with the hubs 7 are toothed or ratchet wheels 9, the teeth being indicated at 10. These wheels 9 are suitably fastened to the hubs 7. These teeth are adapted to be engaged by detents 11 provided on one end of the levers 12, which are fulcrumed at 13 on clamps 14 mounted on the crank arms of the axle 5. The opposite ends of the levers 12 are connected together by a cross member 131 which forms a shoulder adapted to be engaged by the curved end 15 of a lever 16 that is pivotally mounted at 17 on a standard 18 supported on longitudinal bars 19 and 19' of the frame 1. The forward portion of the lever 16 is adapted to rest within a notch 20 of a standard 21 which is also provided with a vertical slot 22 to permit the lever to be lowered after disengaging it from the notch 20. The standard 21 is mounted on a cross bar 23 of the frame. When the operator depresses the lever 16 and then releases it, it is raised to approximately the level of the notch 20 by a spring 24 which connects the lever to the upper end of the standard 21.

When the forward end of the lever 16 is depressed it throws the lower end 15 rearwardly against the member 131, thus swinging the levers 12 to move the detents 11 into the path of rotation of the teeth 10. When the wheels 6 are traveling over the ground the toothed wheels 9 of course rotate and if the detents 11 be engaged by the toothed wheels the levers 12 will be raised to the dotted position indicated at *a* in Fig. 5. Since the levers 12 are pivotally connected with the crank arm 8 of the axle, this movement of course swings the crank arm upward and consequently raises the rear end of the frame 1 and whatever tools are mounted on or attached to the rear portion of said frame.

Figure 4:
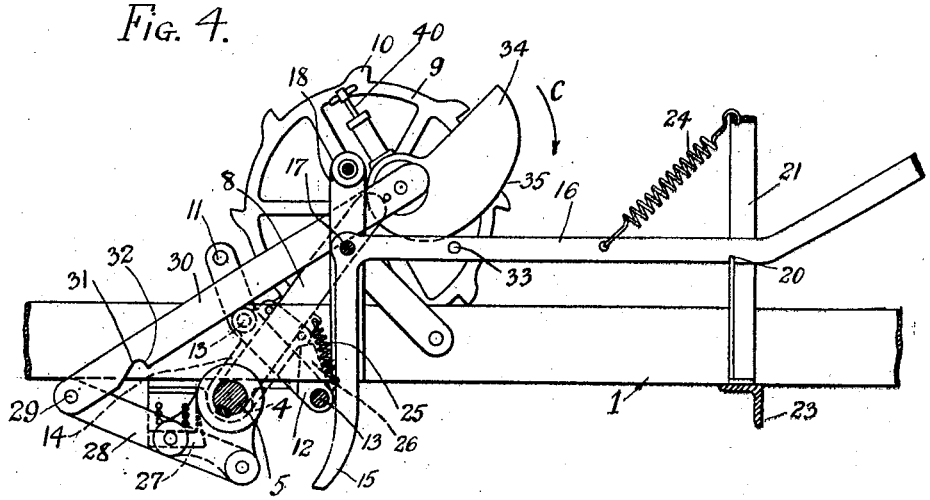
Fig. 4 is an elevation, partly in section, from line indicated by X⁴—X⁴ Fig. 3, the parts being in the position they occupy during the plowing operation.

The levers 12 are yieldingly held with their detents 11 out of engagement with the notched wheels 9 by springs 25, and the detents are limited in their movement away from the path of rotation of the teeth 10 by stops 26 formed on the levers 12 and adapted to engage the clamps 14, as clearly shown in Fig. 4 of the drawings.

Figure 5:
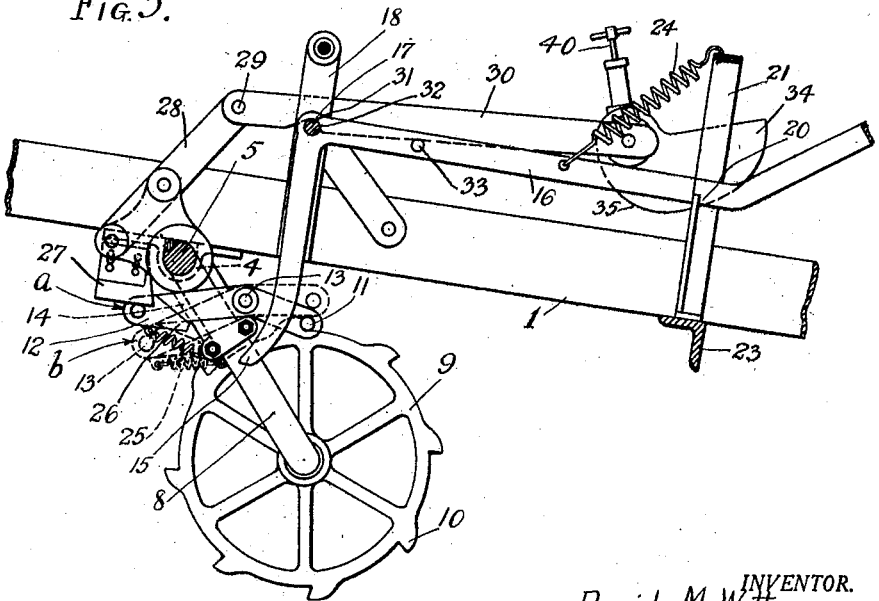
Fig. 5 is an elevation similar to Fig. 4 excepting that the parts are shown in the positions in which they are indicated in broken lines in Fig. 1.

When the levers 12 have been raised to the position indicated at *a* in Fig. 5, the shoulder 131 engages abutments 27 fastened to the frame 1. When this occurs further forward movement of the levers 12 causes the abutments 27 to depress the member 131 relative to the detents 11 which accordingly are withdrawn from engagement with the teeth 10, thus placing the levers 12 in position for lowering as indicated at *b* in Fig. 5; though such lowering will not naturally occur until the operator wills it, since means are provided for preventing the return of the axle to its former position as will be hereinafter described.

The crank of the axle is provided with a fixed arm 28 which is pivoted at 29 to a link 30 that is notched at 31 to form a shoulder 32. The link 30 passes between the standards 18 and rests upon the pivot 17 and is given endwise motion relative to said pivot by turning of the axle as hereinbefore described, so that when the levers 12 are in the position indicated at *a* in Fig. 5, the notch 31 will be in position to receive the pivot 17. In consequence of this, as soon as the detents 11 are retracted from engagement with the toothed wheels 9, the shoulder 32 will engage the pivot 17 to hold the link 30 in the position shown in Fig. 5 to thereby prevent the crank and rear end of the frame from lowering after disengagement of the detents 11 from the toothed wheels.

To release the shoulder 32 from the pivot 17 there is provided an abutment 33 on the lever 16 adapted when said lever is raised by the operator to engage the lower edge of the link 30 to swing said link upwardly. When the lever 16 is thus raised there is nothing to hold the frame with its tools 2 in elevated position and consequently the frame will immediately drop so as to cause the tools to enter the earth as the implement is moved forward. The slot 21 is made sufficiently long to permit of the lever 16 being moved upwardly from the notch 20. As soon as the operator has caused disengagement of the link 30 with the pivot 17, he may release the lever 16, whereupon it will drop to the neutral or normal position shown in Fig. 4.

It is not necessary that the notch 20 be provided for supporting the lever 16 in neutral position, since the spring 24 will effect this, but it is preferable to provide the notch and depend only upon the spring 24 for returning the lever 16 to neutral position after said lever has been depressed to cause the detents 11 to engage the toothed wheels 9.

When the frame drops and pulls the link 30 rearwardly on the pivot 17, it will be clear that some provision must be made to limit the rearward movement of said link so as to limit the depth to which the tools 2 will penetrate the earth, and there is provided for this purpose a stop 34 on the forward end of the link 30 adapted to engage the standard 18 when the frame drops. The stop 34 is preferably of an adjustable character so that the penetrating depth of the tools can be readily governed. In this particular instance the stop 34 is in the form of a cam, the depth adjusting face of the cam being indicated at 35. The cam 34 is rotative on a notched pivot 36 fixed to the link 30, the notches being indicated at 37 in the periphery of the pivot. Reciprocatively mounted on the bearing 39 of the cam is a latch bolt adapted to be selectively engaged with the notches 37 for securing the cam 34 in different angular positions relative to the link 30 whereby to cause any portion of the cam face 35 to be turned into a position for engagement with the standard 18. This will be readily understood by referring to Fig. 4 of the drawings where the cam 34 is shown in position for permitting the tools to penetrate to their maximum depth. To lessen the penetration of the tools the cam 34 will be turned in the direction of the arrow *c* Fig. 4. The latch bolt 40 is yieldingly held in latching position by a spring 41.

It will be clear from the foregoing that any suitable stop may be employed in lieu of the cam 34 for merely limiting the penetration depth of the tools, and it will also be clear that the adjustable stop is of advantage for adjusting the penetration depth of the tools, irrespective of some of the features employed for raising the frame to elevate the tools. In other words the functioning of the stop 34 is not dependent upon the operating lever 16 and detent lever 12.

I claim:

1. In an implement, the combination of a frame, a crank axle supporting the frame, ground wheels journaled on the axle, ground working tools supported by the frame, a ratchet wheel operated by one of the ground wheels, an arm mounted on the crank axle, a link pivoted to said arm and provided with a shoulder, a stationary element mounted on the frame to engage the shoulder when the crank axle is turned to a predetermined position, means to limit rearward motion of the link when the link is released from said shoulder-engaging element, a lever fulcrumed on the crank axle and having a detent and a shoulder, manually operated means to engage the last shoulder to cause the lever to move its detent into engagement with the ratchet wheel, and an abutment on the frame adapted to engage the last shoulder when the crank axle is turned to said predetermined position to retract the lever from ratchet wheel-engaging position.

2. In an implement, the combination of a frame, a crank axle supporting the frame, ground wheels journaled on the axle, ground working tools supported by the frame, a ratchet wheel operated by one of the ground wheels, an arm mounted on the crank axle, a link pivoted to said arm and provided with a shoulder, a stationary element mounted on the frame to engage the shoulder when the crank axle is turned to a predetermined position, means to limit rearward motion of the link when the link is released from said shoulder-engaging element, a lever fulcrumed on the crank axle and having a detent and a shoulder, manually operated means movable to one position to engage the last shoulder to cause the lever to move its detent into engagement with the ratchet wheel, an abutment on the frame adapted to engage the last shoulder when the crank axle is turned to said predetermined position to retract the lever from ratchet wheel-engaging position, and an abutment on the manually-operated member engageable with link to release it from the shoulder-engaging element by movement of said manually-operated member to a second position.

3. In an implement, the combination of a frame, a crank axle supporting the frame, ground wheels journaled on the axle, ground working tools supported by the frame, a ratchet wheel operated by one of the ground wheels, an arm mounted on the crank axle, a link having a shoulder, means cooperating with the shoulder of the link to hold the arm with the crank axle turned to a predetermined position, means shiftably mounted on the crank axle and having a detent and a shoulder, manually operated means to engage the last shoulder to move the shiftably-mounted means into position to cause its detent to engage the ratchet wheel, and an abutment on the frame adapted to engage the last shoulder when the crank axle is turned to said predetermined position to retract the shiftably-mounted means from ratchet-wheel-engaging position.

Signed at Los Angeles, California, this 8th day of November, 1920.

DANIEL M. WATTERS.

Witnesses:
GEORGE H. HILES,
L. BELLE WEAVER.